Nov. 14, 1939.　　　A. L. JOHNSON　　　2,180,209
CONTROL FOR HAND BRAKES
Filed Aug. 6, 1936　　　2 Sheets-Sheet 1
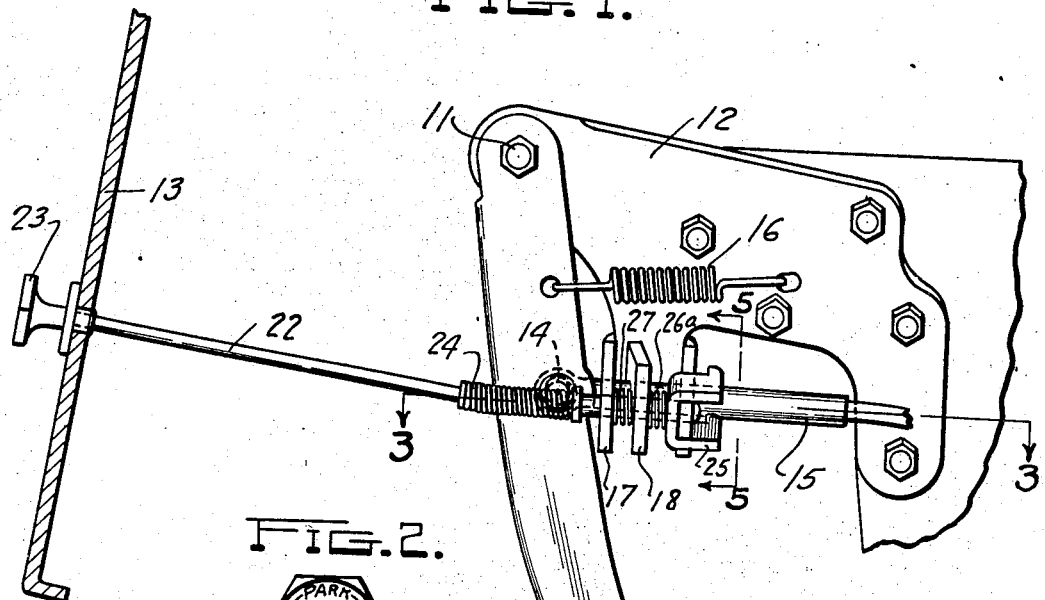
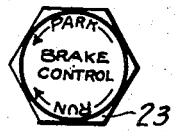
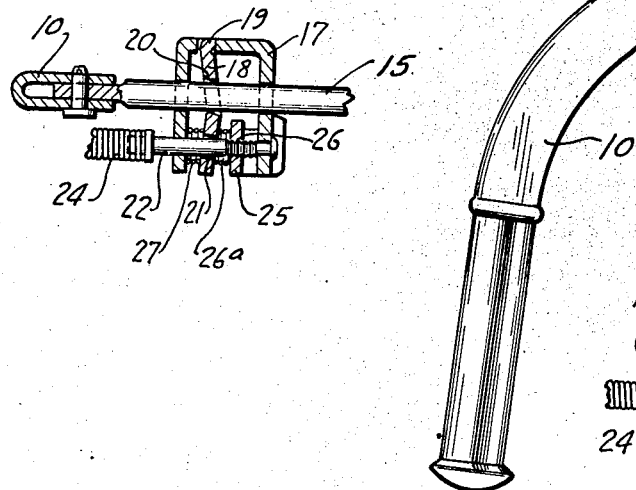
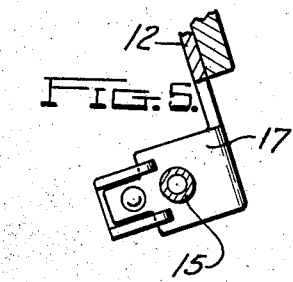
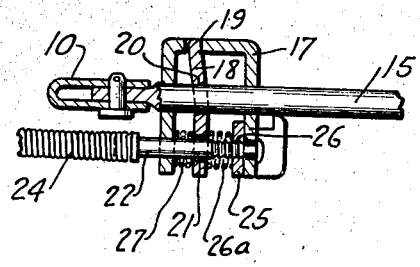
Inventor
Alvin L. Johnson
By
Attorneys

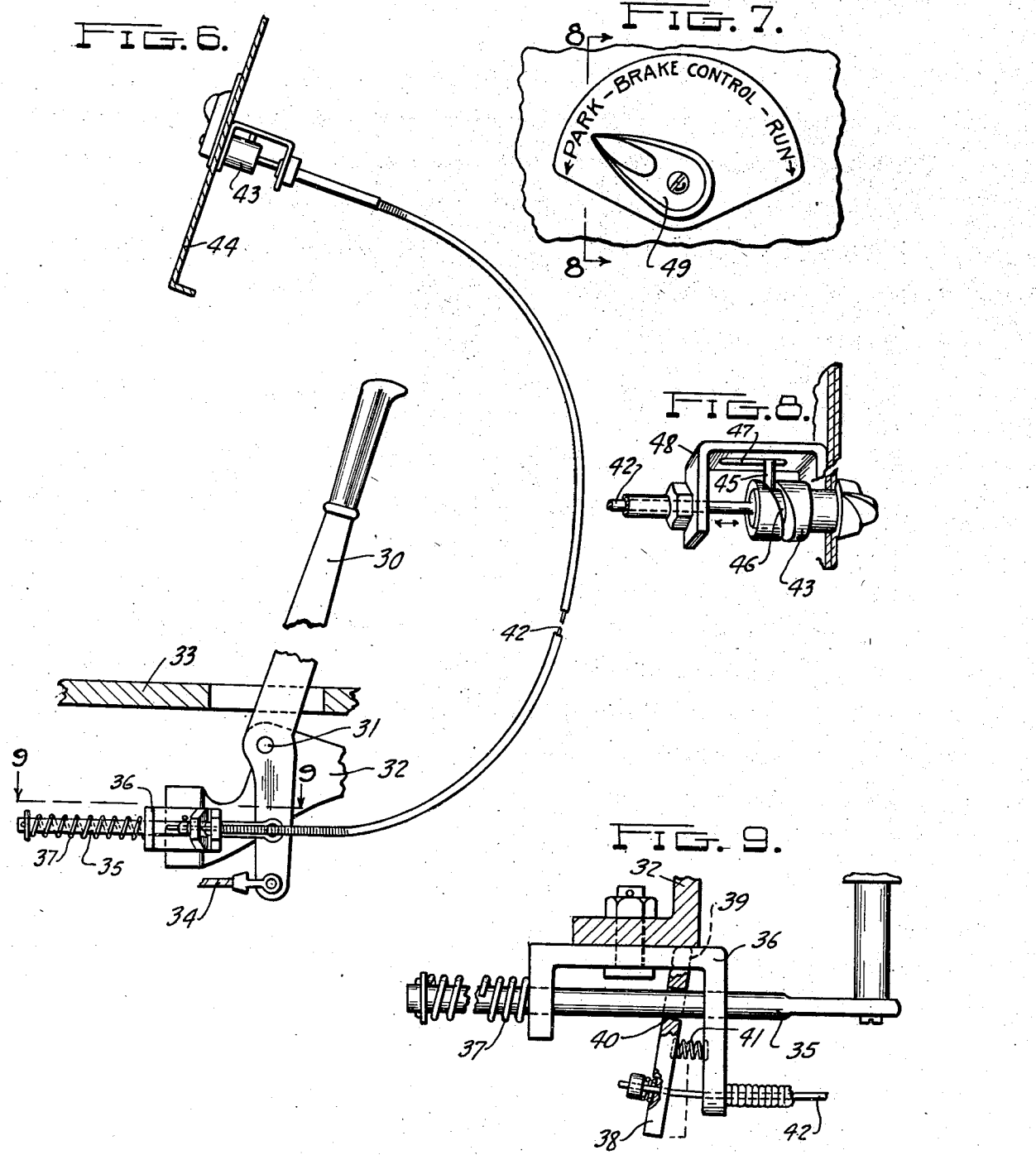

Patented Nov. 14, 1939

2,180,209

UNITED STATES PATENT OFFICE 2,180,209

CONTROL FOR HAND BRAKES

Alvin L. Johnson, Toledo, Ohio, assignor to The American Forging & Socket Company, Pontiac, Mich., a corporation of Michigan Application August 6, 1936, Serial No. 94,640

16 Claims. (Cl. 74—531)

This invention relates to a brake control for automobiles and more particularly to the control of the hand brake.

The object of the invention is to produce a hand brake control whereby the operation of the hand brake may be easily and readily changed for parking purposes or for running purposes so that in one case the brake will remain set to whatever extent the handle is temporarily moved, and in the other case the brake will be set only while force is being applied to the hand brake lever.

Details and minor objects of the invention will appear as the description proceeds.

In the accompanying drawings forming a part of this specification, Figure 1 is a somewhat diagrammatic view of a hand brake pivoted back of the instrument board with control means embodying my invention; Fig. 2 is a detail view of the control button on the instrument board; Fig. 3 is a detail section on the line 3—3 of Fig. 1; Fig. 4 is a section similar to Fig. 3, but showing the parts in a different position; Fig. 5 is a detail section on the line 5—5 of Fig. 1; Fig. 6 is a diagrammatic view of a hand brake lever pivoted below the floor board of the automobile and having a control embodying my invention; Fig. 7 is a detail view of the control button employed with the form of brake shown in Fig. 6; Fig. 8 is a detail view on the line 8—8 of Fig. 7, and Fig. 9 is a detail view on the line 9—9 of Fig. 6.

In the form of apparatus disclosed in Figs. 1 to 5, inclusive, there is a hand brake lever 10 pivoted at 11 to a bracket 12 mounted in stationary position back of the instrument board 13. Pivoted to the lever 10 at 14 there is a rod 15 which is connected by any usual or suitable means, such as a cable or rod, to the brake. A spring 16 attached to lever 10 and bracket 12 normally holds the lever in its non-braking position shown in Fig. 1.

Projecting from bracket 12, there is a horseshoe shaped bracket 17 through the legs of which the rod 15 is passed and in which it has bearing. Between the two legs of the bracket 17 there is a locking member 18 which is pivoted at 19 in the closed end of the U-shaped bracket and which has an opening 20 therethrough for rod 15. Locking member 18 is also provided with an opening 21 through which there passes a rod 22 connected to control button 23 on the instrument board. In the form shown, there is interposed a flexible portion 24 to act as a universal joint in rod 22. A nut 25 is threaded at 26 upon rod 22 between the locking member 18 and the rear leg of U-shaped member 17. A spring 26ª is provided between locking member 18 and nut 25 and another spring 27 is provided between locking member 18 and the other leg of the U-shaped member.

The operation of the apparatus thus far disclosed is as follows:

It will be understood that, with the brake lever 10 in the position in which it is shown in Fig. 1, the brake is released. With the control button arranged for parking, as shown in Fig. 2, the nut 25 is in the position in which it is shown in Fig. 3. In such position the spring 27 exerts pressure on the locking member 18 causing it to cramp the rod 15. Under these circumstances, when the lever 10 is moved to the left, as viewed in Fig. 1, rod 15 slides through locking member 18, but when the lever 10 is released, the locking member 18 is biased back to the position in which it is shown in Fig. 3 and cramps rod 15 so that the rod cannot slide back to the right.

When it is desired to release the brake which has been set during parking, the control button is turned in the direction indicated by the arrow for turning it to "run" position, and this moves nut 25 from the position in which it is shown in Fig. 3 to the position in which it is shown in Fig. 4, thereby compressing spring 26ª. Thereafter a pull on lever 10 releases the stress upon the locking member and compressed spring 26ª biases it back against spring 27 so that it will no longer cramp on rod 15. When the lever is again released, spring 16 returns it to its original non-braking position. While the control button is in this "run" position, the brake handle 10 may be manipulated, if desired, as a temporary emergency or service brake, braking the car only so long as the operator exerts pressure on lever 10 and promptly releasing the brake when the handle is released. Of course, when it is desired to park, the control button is turned back as indicated thereon to bring "park" uppermost as shown in Fig. 2, and this moves the nut 25 back to the position in which it is shown in Fig. 3.

The form of the device shown in Figs. 6 to 9 is constructed on the same principles as that previously described, but is shown applied to a hand brake lever 30 which is pivoted at 31 to a bracket 32 beneath the floor board 33 of an automobile. Shown at 34 is a member connecting the lever to suitable brake-operating means, not shown. A control rod 35 connected to the lever runs through openings in a bracket 36 mounted upon bracket 32. A spring 37 around rod 35 and bearing against bracket 36 normally pulls the rod to bias lever 30 to the non-braking position in which it is shown in Fig. 6.

A locking member 38 is pivoted at 39 to bracket 36 and has therethrough an opening 40 which receives rod 35. A spring 41 normally biases locking member 38 so as to normally prevent movement of rod 35 to the left, but to permit its free movement to the right.

A control wire 42 is yieldingly connected to locking member 38 and extends to a barrel cam 43 mounted at the rear of the instrument board 44. In the form shown, wire 42 extends axially into barrel cam 43 and then upward at 45 through a slot 46 in the cam into a slot 47 in bracket 48 mounted upon the instrument board. The barrel cam has attached thereto a control pointer 49 mounted upon the instrument board and movable as indicated to parking or running position.

It will be readily seen that, when the parts are in the position shown in Fig. 9, the locking member 38 will hold the rod 35 to the right as far as it is moved by lever 30 so that, when the brake is applied for parking purposes, it will be held in applied position by locking member 38 until the control pointer 49 is moved to "run" position. The movement of the pointer to "run" position turns the cam 43 and thereby moves end 45 to the right and exerts spring pressure upon locking member 38 urging it to the right as viewed in Fig. 8, and thereafter a pull upon the brake lever releases the clamp from rod 35 and permits spring 37 to return the brake lever to its normal non-braking position, as described in connection with the form shown in Figs. 1 to 5. While pointer 49 remains in the "run" position, it will be seen that locking member 38 is held in inactive position so that the brake may be applied temporarily for emergency or service purposes and released at will.

The form of brake control disclosed is advantageous because it is very simple and accurate in operation. It allows the brake to be set to the required degree and holds it in exactly the position in which it is set, avoids the excess strain upon the brake, car operator and connecting parts sometimes necessitated by the common ratchet control where the brake handle must be moved a full notch at a time to hold it in its set position. Also the control device, whereby the brake is quickly and easily converted from a parking brake to a running brake, is a great convenience insures the holding of the brake in set position when desired and its release when, and only when, desired. The location of the control member on the instrument board for convenient manipulation in starting or parking is effected without complicated mechanism.

While two forms of the invention have been disclosed, it will be readily understood that various other changes may be made in the mechanical details of the construction without departing from the principle of the invention.

What I claim is:

1. In combination, a hand brake lever for an emergency brake, a rod movable with the lever, a locking member pivoted at one side of the rod, said locking member having an opening in which the rod passes, a spring constantly biasing the locking member in the direction to cramp it upon the rod and lock the rod against movement in brake-releasing direction, a control member movable between "park" position and "run" position, means to retain said member in either of said positions until manually moved to the other, and connections from the control member yieldingly resisting the movement of the locking member in locking direction when the control member is in "run" position and diminishing this resistance when the control member is moved to "park" position, whereby the brake remains set to any degree to which the hand lever sets it while the control member is in "park" position and the brake is released whenever brake setting stress exerted upon the hand lever, while the control member is in "run" position, is released therefrom.

2. In an automobile having an instrument board and a hand lever operated emergency brake, locking means operable to lock the brake against release, a manually operable member on the instrument board movable between a "park" position and a "run" position, and connections rendering the lock operative when the member is in "park" position and inoperative when the member is in "run" position, and including an element for retaining said lock in either of said positions.

3. In an automobile having an emergency brake and an instrument board, a hand lever for setting the brake, a rod reciprocated longitudinally in setting and releasing the brake, a locking plate surrounding the rod and pivoted at one side thereof, a spring normally urging the plate in the direction to cramp on the rod and lock it against brake-releasing movement, a member on the instrument board, and connections including helical-groove means and operable by turning said member in one direction to move the plate to non-locking position and by turning said member in the other direction to permit locking action of the plate.

4. Apparatus in accordance with claim 3 and comprising a nut and a screw movable within the nut by the member on the instrument board to engage the free end of the locking plate and bias it to inoperative position.

5. Apparatus in accordance with claim 3 and comprising a cam moved by said member, and connections from the cam for rendering the plate inoperative when the member and cam are turned for that purpose.

6. Apparatus in accordance with claim 3 and in which the hand lever is pivoted back of the instrument board and approximately in line with said member.

7. Apparatus in accordance with claim 3 and in which the hand brake is pivoted below the car floor and comprising a flexible connection extending from the member to the locking plate.

8. Apparatus in accordance with claim 3 and wherein said connections comprise a spring biased, by movement of the control member to "run" position, to resist the first said spring.

9. In combination with a hand lever for an emergency brake, a rod connected with the lever, a locking member pivoted at one side of the rod and having an opening through which the rod passes, a spring constantly biasing the locking member in a direction to cramp same upon the rod and lock the latter against movement to brake releasing position, a control member movable between "park" and "run" positions, means to retain said member in either of said positions until manually moved to the other, connections from the control member for operating the locking member to resist movement thereof including a second spring opposing the first spring, means associated with the connection to effect compression of the second spring in locking direction when the control member is in "run" position and diminishing such resistance when the control member is in "park" position, whereby the brake remains set to any degree by the hand lever while the control member is in "park" position and the brake is released whenever brake setting stress exerted upon the hand lever while the control member is in "run" position, is released therefrom.

10. In an automobile having an emergency brake and an instrument board, a hand lever for setting the brake, a rod having longitudinal reciprocatory motion for setting and releasing the brake, a pivoted locking member having a part to receive the rod, spring means normally urging the member in a direction to cramp it on the rod and lock the latter against brake releasing movement, a turnable operating member on the instrument board, means operable by said instrument board member to move the locking member to nonlocking position, and connections operable upon turning said member on the instrument board in one direction to move the locking member to unlocking position and by turning said member on the instrument board in the opposite direction to lock the locking member, said connections including a helical portion and a part operable by the connection for moving the helical portion axially thereof.

11. In an automobile having an instrument board and a hand lever operated emergency brake, latching means to latch the brake against release, a manually shiftable member on the instrument board shiftable from "park" to "run" positions, and means connecting the manually shiftable member with the latch to render the latter operative when the member is shifted to "park" position and for positively actuating the latter to inoperative position when the member is shifted in an opposite direction to "run" position.

12. In combination with a hand lever for an automobile emergency brake, a rod associated with the lever, a locking plate pivoted at one side of the rod and having an opening through which the rod passes, a spring constantly biasing the locking plate in a direction to cramp same upon the rod and lock the latter against movement to brake releasing position, manual means connected to said locking plate for rocking same away from cramping position, and spring means for moving said hand lever to brake-releasing position.

13. In combination with a hand lever for an automobile emergency brake, a locking plate connected and arranged to lock said lever against movement, a spring constantly biasing said plate to locking position, a spring normally opposing said first spring, and means operating through said second spring to cause movement of said plate for freeing said lever.

14. In combination with a hand lever for an automobile emergency brake, a control for said lever, said control comprising a relatively movable lever part, a relatively stationary part, a locking plate pivoted to one of said parts and having an opening receiving the other part, a spring constantly biasing said plate to locking position, a second spring in opposed relation to said first spring tending to resist plate movement to locking position, and means cooperating with said second spring to cause movement of said plate for freeing said lever.

15. In combination with a hand lever for an automobile emergency brake, a locking member associated with said lever to prevent movement thereof in brake releasing direction, and a control for said locking member including spring means tending to move said locking member to locked position, spring means tending to move said locking member to released position, one of said spring means being stronger than the other, and means for changing the effective relative force of said stronger spring means, whereby the locking member may be biased toward either locked position or released position at will.

16. Means as set forth in claim 15 in which said locking member comprises a cramping element frictionally engageable with a cooperating holding portion to prevent movement of the lever in one direction and slidable along said cooperating holding portion in the other direction, said stronger spring means being that which tends to move the locking member toward released position.

ALVIN L. JOHNSON.